(12) United States Patent
Kuroki

(10) Patent No.: US 11,835,134 B2
(45) Date of Patent: Dec. 5, 2023

(54) CONTINUOUSLY VARIABLE TRANSMISSION

(71) Applicants: JATCO Ltd, Fuji (JP); NISSAN MOTOR CO., LTD., Yokohama (JP)

(72) Inventor: Atsushi Kuroki, Yokohama (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 370 days.

(21) Appl. No.: 17/270,256

(22) PCT Filed: Sep. 9, 2019

(86) PCT No.: PCT/JP2019/035330
§ 371 (c)(1),
(2) Date: Feb. 22, 2021

(87) PCT Pub. No.: WO2020/084936
PCT Pub. Date: Apr. 30, 2020

(65) Prior Publication Data
US 2021/0341039 A1    Nov. 4, 2021

(30) Foreign Application Priority Data

Oct. 22, 2018 (JP) .................................. 2018-198804

(51) Int. Cl.
*F16H 9/18*    (2006.01)

(52) U.S. Cl.
CPC ..................... *F16H 9/18* (2013.01)

(58) Field of Classification Search
CPC .. F16H 61/66272; F16H 63/065; F16H 55/56; F16H 61/662; F16H 61/66259; F16H 9/18

USPC ........................................................ 474/28
See application file for complete search history.

(56) References Cited

U.S. PATENT DOCUMENTS

| | | | | |
|---|---|---|---|---|
| 2 A | * | 7/1836 | Goulding | D01G 21/00 57/58.49 |
| 4,292,031 A | * | 9/1981 | Rattunde | F16H 9/12 474/18 |
| 4,717,368 A | * | 1/1988 | Yamaguchi | F16H 61/662 474/28 |
| 5,310,384 A | * | 5/1994 | Siemon | F16H 59/38 474/18 |
| 5,803,846 A | * | 9/1998 | Yamada | F16H 55/56 474/18 |
| 5,871,411 A | * | 2/1999 | Senger | F16H 61/66254 474/11 |
| 6,015,359 A | * | 1/2000 | Kunii | F16H 57/0489 474/18 |

(Continued)

FOREIGN PATENT DOCUMENTS

JP    2001-263463 A    9/2001

*Primary Examiner* — Henry Y Liu
(74) *Attorney, Agent, or Firm* — Foley & Lardner LLP

(57) ABSTRACT

A continuously variable transmission includes: a fix pulley; a slide pulley: an endless annular member sandwiched by the fix pulley and the slide pulley; a cylinder member which is fixed to the fix pulley, and which includes a cylinder cylindrical portion constituting a wall of a pulley pressure receiving chamber; and a stopper member disposed at a position at which the stopper member is abutted on the cylinder member when a hydraulic pressure which is equal to or greater than a predetermined value is supplied to the pulley pressure receiving chamber.

4 Claims, 4 Drawing Sheets

(56) References Cited

U.S. PATENT DOCUMENTS

| | | | | |
|---|---|---|---|---|
| 6,089,999 A * | 7/2000 | Imaida | F16H 55/56 | 474/18 |
| 6,152,843 A * | 11/2000 | Murakami | F16H 55/56 | 474/28 |
| 6,190,274 B1 * | 2/2001 | Walter | F16H 9/06 | 474/28 |
| 6,336,878 B1 * | 1/2002 | Ehrlich | F16H 63/065 | 474/18 |
| 6,459,978 B2 * | 10/2002 | Taniguchi | F16H 61/66259 | 475/116 |
| 6,585,613 B1 * | 7/2003 | Walter | F16H 61/66272 | 474/70 |
| 6,591,177 B1 * | 7/2003 | Loffler | F16H 61/12 | 474/18 |
| 7,222,005 B2 * | 5/2007 | Kang | F16H 61/12 | 474/18 |
| 7,264,564 B2 * | 9/2007 | Walter | F16H 55/56 | 474/18 |
| 7,341,533 B2 * | 3/2008 | Wang | F16H 57/021 | 427/451 |
| 7,402,118 B2 * | 7/2008 | Kimura | F16H 61/66254 | 474/18 |
| 7,666,110 B2 * | 2/2010 | Iwatsuki | F16H 61/66272 | 474/28 |
| 7,686,715 B2 * | 3/2010 | Carlson | F16H 63/065 | 474/18 |
| 7,806,791 B2 * | 10/2010 | Izumi | F16H 61/66272 | 474/18 |
| 7,922,610 B2 * | 4/2011 | Nihei | F16H 61/0021 | 474/18 |
| 7,951,026 B2 * | 5/2011 | Soga | F16H 61/0206 | 474/28 |
| 8,100,791 B2 * | 1/2012 | Yamaguchi | F16H 63/065 | 184/7.3 |
| 8,460,137 B2 * | 6/2013 | Kajigaya | G01P 3/443 | 474/18 |
| 8,798,877 B2 * | 8/2014 | Ayabe | F16H 61/66259 | 474/18 |
| 8,857,382 B2 * | 10/2014 | Yagasaki | F16H 61/0031 | 477/45 |
| 9,182,017 B2 * | 11/2015 | Yoshida | F16H 9/125 | |
| 9,970,516 B2 * | 5/2018 | Tsuji | F16H 55/56 | |
| 2001/0049312 A1 * | 12/2001 | Warner | F16H 63/065 | 474/18 |
| 2002/0142870 A1 * | 10/2002 | Okano | F16H 9/125 | 474/18 |
| 2004/0209719 A1 * | 10/2004 | Ochiai | B60W 10/04 | 474/18 |
| 2005/0090340 A1 * | 4/2005 | Wang | F16H 55/56 | 474/8 |
| 2005/0107195 A1 * | 5/2005 | Katou | F16H 63/065 | 474/18 |
| 2006/0058126 A1 * | 3/2006 | Faust | F16H 55/56 | 474/8 |
| 2006/0058127 A1 * | 3/2006 | Walter | F16H 9/125 | 474/8 |
| 2006/0058128 A1 * | 3/2006 | Glas | F16H 9/125 | 474/8 |
| 2006/0058130 A1 * | 3/2006 | Vornehm | F16H 55/56 | 474/18 |
| 2006/0105867 A1 * | 5/2006 | Reuschel | F16H 55/56 | 474/18 |
| 2007/0142142 A1 * | 6/2007 | Yamaguchi | F16H 61/66272 | 474/18 |
| 2009/0062044 A1 * | 3/2009 | Shioiri | F16H 55/56 | 474/28 |
| 2009/0173592 A1 * | 7/2009 | Walter | F16H 55/56 | 192/66.2 |
| 2010/0248874 A1 * | 9/2010 | Katou | F16H 61/66272 | 474/28 |
| 2011/0230285 A1 * | 9/2011 | Hinami | F16H 61/0021 | 474/28 |
| 2012/0244974 A1 * | 9/2012 | Tsuji | F16H 55/56 | 474/28 |
| 2013/0165282 A1 * | 6/2013 | Hattori | F16H 61/02 | 474/28 |
| 2014/0031154 A1 * | 1/2014 | Yoshida | F16H 9/125 | 474/8 |
| 2014/0128188 A1 * | 5/2014 | Ouchida | F16H 61/00 | 474/28 |
| 2014/0274505 A1 * | 9/2014 | Kinoshita | F16H 61/12 | 474/28 |
| 2014/0342860 A1 * | 11/2014 | Suzuki | F16H 61/66259 | 474/28 |
| 2014/0378251 A1 * | 12/2014 | Ishino | F16H 9/16 | 475/210 |
| 2015/0148158 A1 * | 5/2015 | Nishida | F16H 61/662 | 91/419 |
| 2015/0369363 A1 * | 12/2015 | Kanehara | F16H 61/0025 | 474/28 |
| 2016/0047470 A1 * | 2/2016 | Aoki | F16H 9/18 | 474/28 |
| 2016/0131230 A1 * | 5/2016 | Kawakami | F16H 9/18 | 474/28 |
| 2017/0152924 A1 * | 6/2017 | Tsuji | F16H 55/56 | |

* cited by examiner

CONTINUOUSLY VARIABLE TRANSMISSION

TECHNICAL FIELD

This invention relates to a continuously variable transmission.

BACKGROUND ART

A patent document 1 discloses a continuously variable transmission including a cylinder member which constitutes a wall of a pulley hydraulic chamber, which is located on a bottom side when viewed from a sheave surface side of a slide pulley.

When unexpected high hydraulic pressure is supplied to the pulley chamber due to an abnormality of an actuator for the pulley hydraulic pressure supply, and so on, one of following two countermeasures is made in general.

(A) The configuration is set so that the high hydraulic pressure is not supplied to the pulley chamber.

For example, there is provided a valve configured to release the oil when the hydraulic pressure becomes equal to or greater than a predetermined hydraulic pressure, so as not to supply the hydraulic pressure which is equal to or greater than the predetermined hydraulic pressure, to the pulley hydraulic chamber.

(B) The configuration is set so as not to deform the cylinder member even when the hydraulic pressure which is equal to or greater than the predetermined hydraulic pressure is supplied.

For example, a plate thickness of the cylinder member is increased to increase the rigidity of the cylinder member.

The above countermeasures are based on thoughts to prevent the deformation of the cylinder member. However, in the case (A), the number of the components is increased. In the case (B), the weight is increased in accordance with the increase of the plate thickness.

Accordingly, it is required to suppress the deformation of the cylinder member without the increase of the number of the components, and the increase of the weight.

PRIOR ART DOCUMENT

Patent Document

Japanese Patent Application Publication No. 2001-263463

SUMMARY OF THE INVENTION

In the present invention, a continuously variable transmission comprises:
a fix pulley;
a slide pulley:
an endless annular member sandwiched by the fix pulley and the slide pulley;
a cylinder member which is fixed to the fix pulley, and which includes a cylinder cylindrical portion constituting a wall of a pulley pressure receiving chamber; and
a stopper member disposed at a position at which the stopper member is abutted on the cylinder member when a hydraulic pressure which is equal to or greater than a predetermined value is supplied to the pulley pressure receiving chamber.

In the present invention, in a case where the cylinder member is deformed when the hydraulic pressure which is equal to or greater than the predetermined value is supplied to the pulley pressure receiving chamber, the stopper member is abutted on the cylinder member. With this, it is possible to suppress the deformation of the cylinder member without the increase of the number of the components, and the increase of the weight.

DESCRIPTION OF EMBODIMENTS

Hereinafter, a belt type continuously variable transmission 1 for a vehicle according to an embodiment of the present invention is explained.

Figure 1:
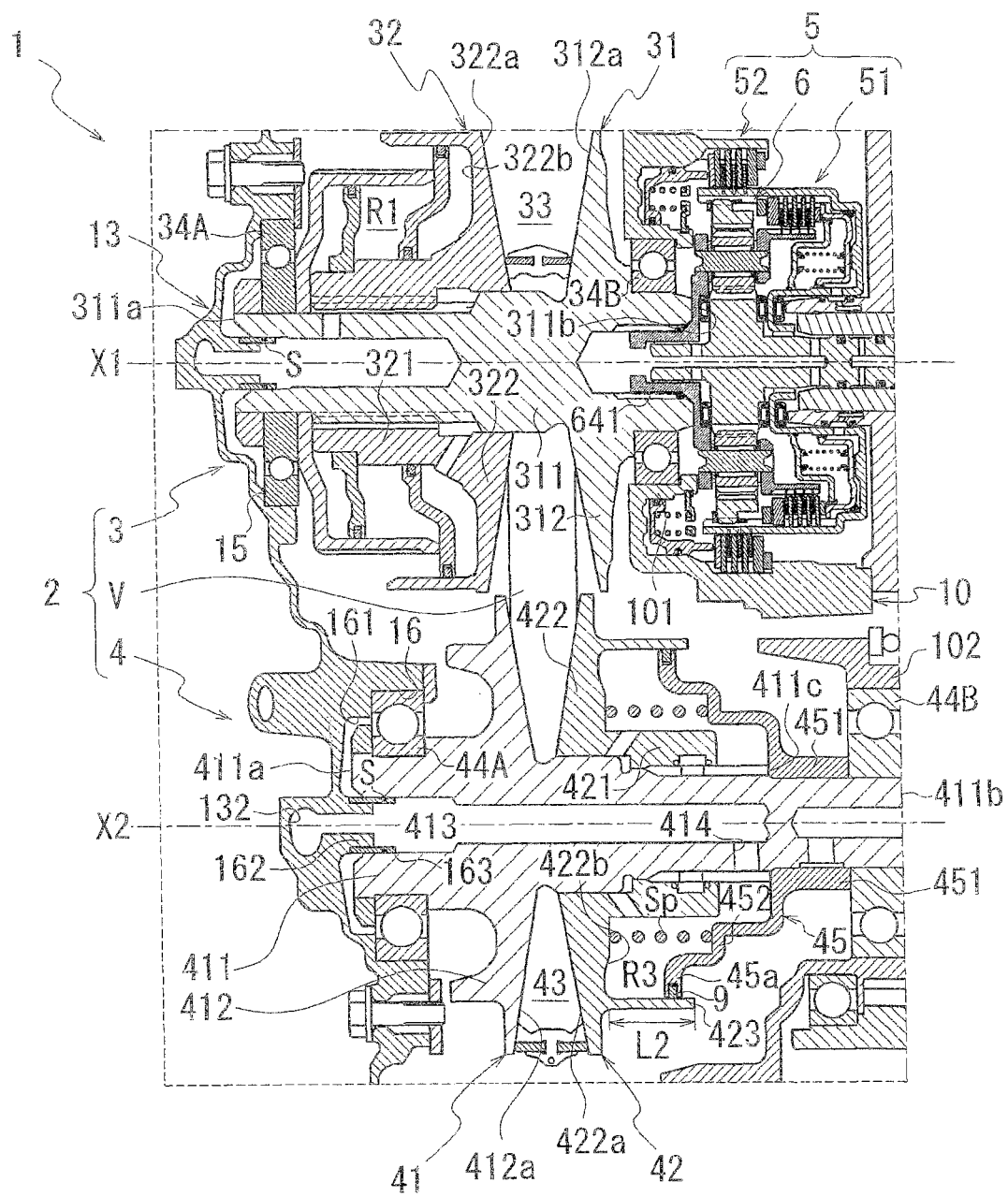
FIG. 1 is a view for explaining a main part of a continuously variable transmission.

FIG. 1 is a view for explaining a main part of the continuously variable transmission 1.

Figure 2:
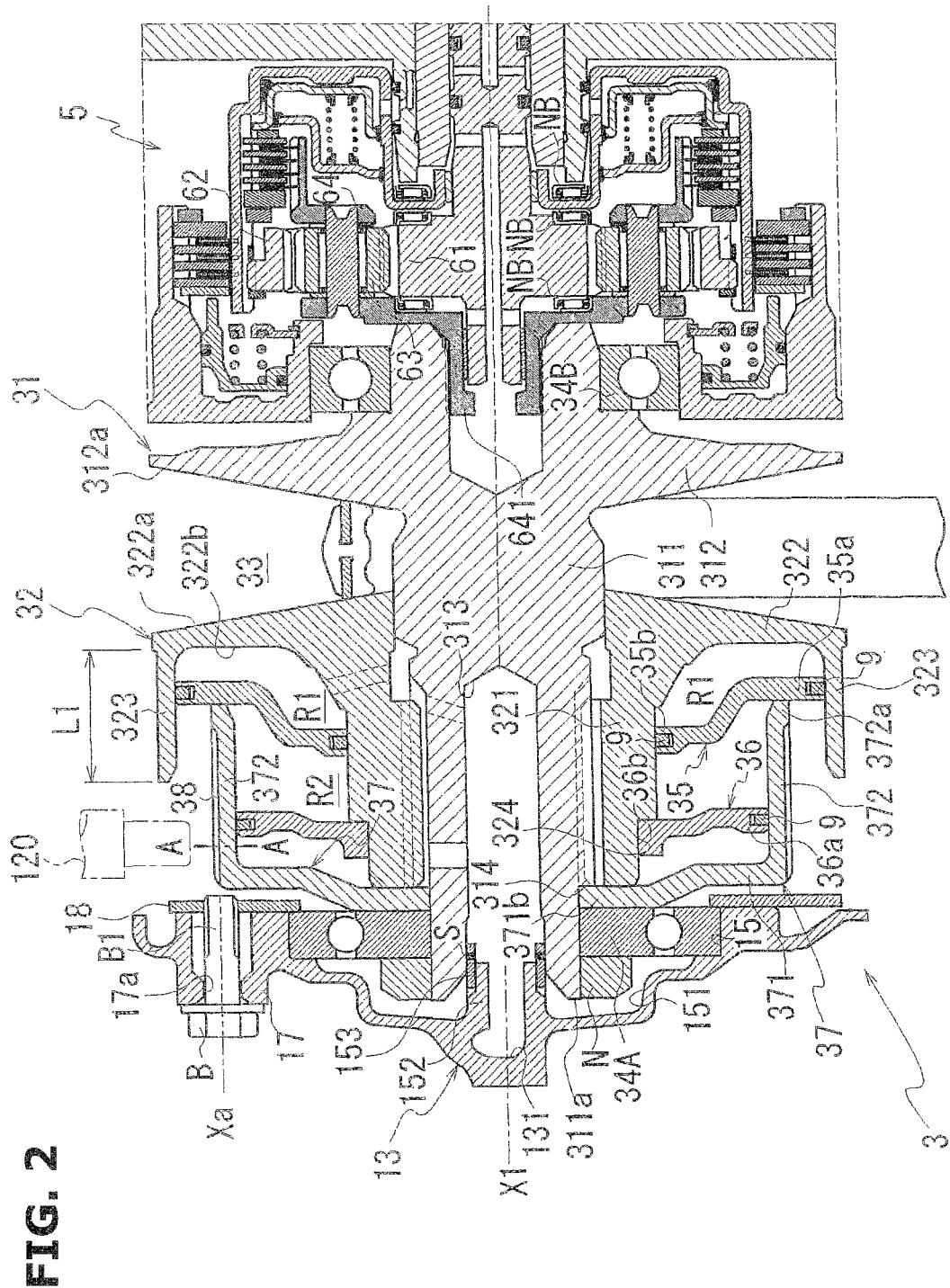
FIG. 2 is a view for explaining a portion around a primary pulley and a forward and backward switching mechanism of the continuously variable transmission.

FIG. 2 is a view for explaining a portion around a primary pulley 3 and a forward and backward switching mechanism 4 of the continuously variable transmission.

Figure 3A:
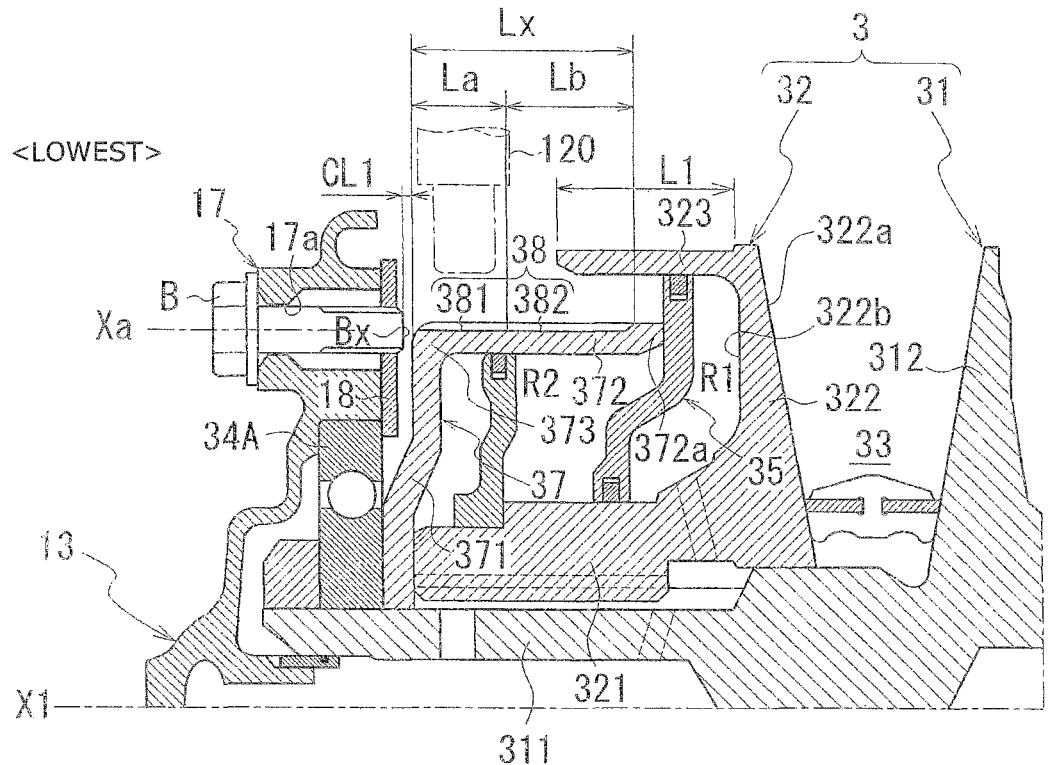
FIGS. 3A and 3B are views for explaining a main part of the primary pulley.
Figure 3B:
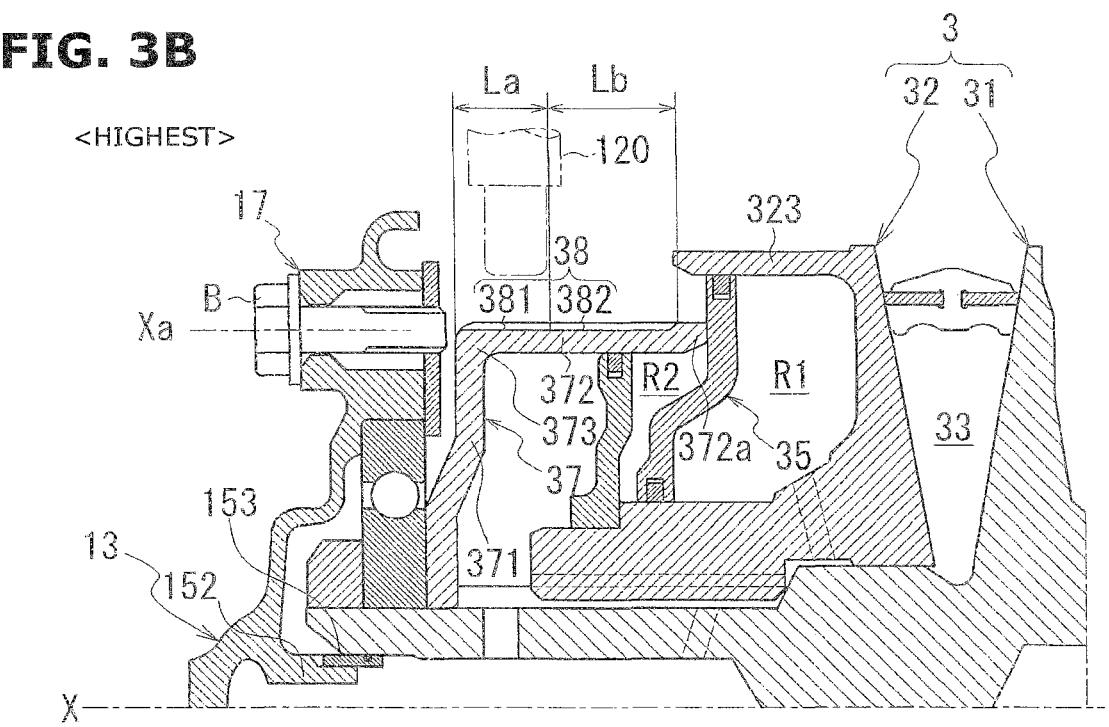

FIGS. 3A and 3B are views for explaining a main part of the primary pulley 3. FIG. 3A is a view for explaining a position relationship between a slide pulley 32 and a rear cylinder 37 at a lowest transmission gear ratio of a variator 2. FIG. 3B is a view for explaining a position relationship between the slide pulley 32 and the rear cylinder 37 at a highest transmission gear ratio of the variator 2.

Figure 4A:
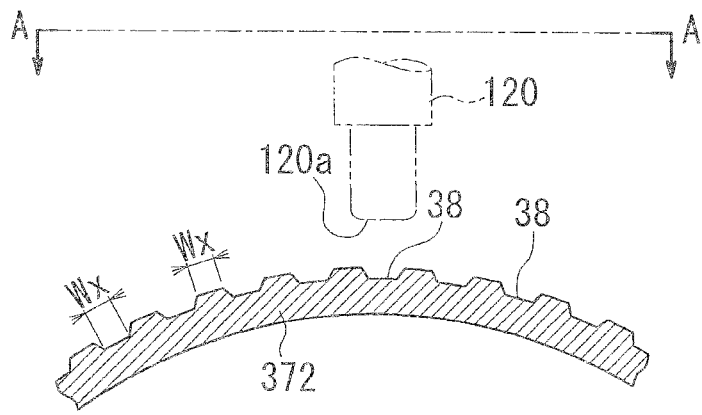
FIGS. 4A and 4B are views for explaining grooves of an outer circumference of a rear cylinder.
Figure 4B:
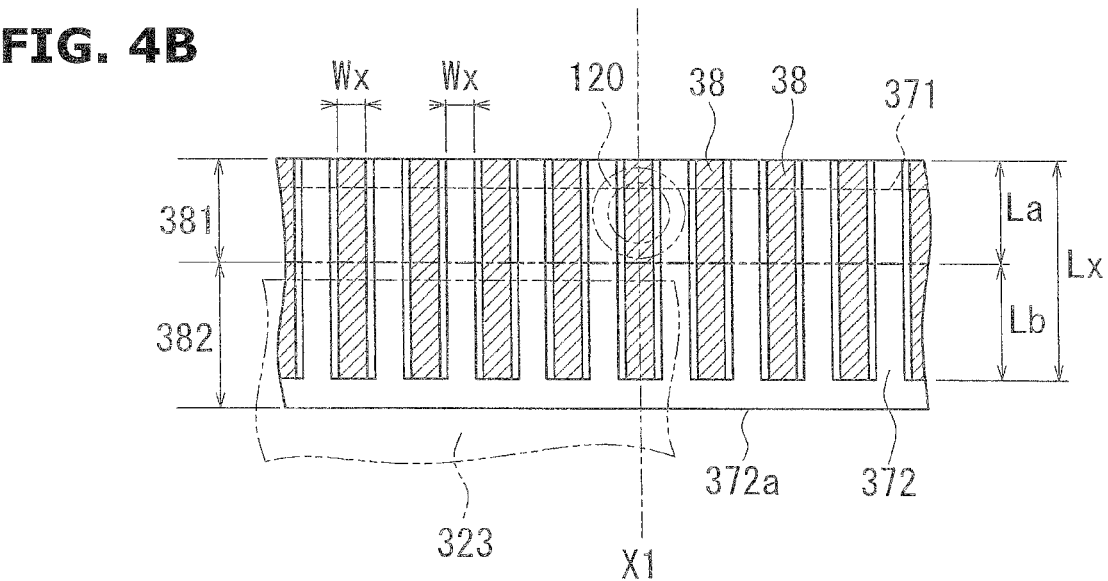

FIGS. 4A and 4B are a view for explaining grooves 38 of an outer circumference of a circumference wall portion 372 of the rear cylinder 37. FIG. 4A is a view taken along an A-A of FIG. 2. FIG. 4B is a deployment view showing the circumference wall portion 372 when viewed from an arrow A-A of FIG. 4A. In FIG. 4B, hatchings are added to a portion of the grooves 38 for the explanation.

Hereinafter, a belt type continuously variable transmission 1 for a vehicle according to an embodiment of the present invention is explained.

FIG. 1 is a view for explaining a main part of the continuously variable transmission 1.

FIG. 2 is a view for explaining a portion around a primary pulley 3 and a forward and backward switching mechanism 4 of the continuously variable transmission.

FIGS. 3A and 3B are views for explaining a main part of the primary pulley 3. FIG. 3A is a view for explaining a position relationship between a slide pulley 32 and a rear cylinder 37 at a lowest transmission gear ratio of a variator 2.

FIG. 3B is a view for explaining a position relationship between the slide pulley 32 and the rear cylinder 37 at a highest transmission gear ratio of the variator 2.

FIGS. 4A and 4B are a view for explaining grooves 38 of an outer circumference of a circumference wall portion 372 of the rear cylinder 37. FIG. 4A is a view taken along an A-A of FIG. 2. FIG. 4B is a deployment view showing the circumference wall portion 372 when viewed from an arrow A-A of FIG. 4A. In FIG. 4B, hatchings are added to a portion of the grooves 38 for the explanation.

As shown in FIG. 1, in the belt type continuously variable transmission 1, a rotation drive force of an engine (not shown) is inputted through a torque converter (not shown) to the forward and backward switching mechanism 5.

The forward and backward switching mechanism 5 includes a planetary gear set 6; a forward clutch 51; and a backward brake 52.

In the forward and backward switching mechanism 2, when the forward clutch 51 is engaged, the rotation inputted from a torque converter side is outputted in the forward rotation to the variator 2. When the backward brake 52 is engaged, the rotation inputted from the torque converter side is outputted in the reverse rotation to the variator 2.

The variator 2 includes a pair of pulleys (a primary pulley 3 and a secondary pulley 4); and a belt V (endless annular member) wound around the pair of pulleys.

The variator 2 is configured to vary wounding radii of the belt V around the pair of the pulleys (the primary pulley 3 and the secondary pulley 4), thereby to vary the rotation inputted from the forward and backward switching mechanism 5 side by a transmission, and to output the rotation to a final speed reduction mechanism (not shown) side.

The primary pulley 3 includes a fix pulley 31 (fix pulley) and a slide pulley 32 (movable pulley).

The fix pulley 31 includes a shaft portion 311 disposed along a rotation axis X1; and a sheave portion 312 extending from an outer circumference of the shaft portion 311 in the radially outward direction.

Bearings 34A and 34B are inserted and fixed onto a first end 311a and a second end 311b of the shaft portion 311 in a longitudinal direction of the shaft portion 311.

The first end 311a and the second end 311b of the shaft portion 311 are rotatably supported through the bearings 34A and 34B on a support hole 15 of a side cover 13, and a support portion 101 of the transmission case 10.

In this state, a connection member 641 of a carrier 64 of the planetary gear set 6 (cf. FIG. 2) is connected to the second end 311b of the shaft portion 311 so as not to be rotated relative to the second end 311b.

The slide pulley 32 includes an annular base portion 321 inserted and mounted onto the shaft portion 311 of the fix pulley 31; and a sheave portion 322 extending from the outer circumference of the annular base portion 321 in the radially outward direction.

The annular base portion 321 of the slide pulley 32 is spline-mounted on the outer circumference of the shaft portion 311. The slide pulley 32 is configured to be moved in the axial direction (the rotation axis X1 direction) of the shaft 311 in a state in which the relative rotation between the fix pulley 31 and the slide pulley 32 is restricted.

The sheave portion 312 of the fix pulley 31 confronts the sheave portion 322 of the slide pulley 32 with a clearance in the rotation axis X1 direction.

The primary pulley 3 includes a V groove 33 which is formed between the sheave surface 312a of the fix pulley 31 and the sheave surface 322a of the slide pulley 32, and around which the belt V is wound.

As shown in FIG. 2, a cylindrical cylinder portion 323 is formed on the outer circumference side of the sheave portion 322 on a pressure receiving surface 322b on a side opposite to the sheave surface 322a.

The cylinder portion 323 extends along the rotation axis X1 in a direction apart from the sheave portion 322 to have a predetermined length L1.

An outer circumference portion 35a of a front plunger 35 is abutted on the inner circumference of the cylinder portion 323.

A D ring 9 is mounted on the outer circumference portion 35a of the front plunger 35. The D ring 9 seals a clearance between the inner circumference of the cylinder portion 323 and the outer circumference portion 35a.

The inner circumference portion 35b of the front plunger 35 is abutted on the outer circumference of the annular base portion 321 of the slide pulley 32 from the outer circumference side.

A D ring 9 is mounted on the inner circumference portion 35a of the front plunger 35. The D ring 9 seals a clearance between the outer circumference of the cylinder portion 321 and the inner circumference portion 35b.

In the primary pulley 3, a hydraulic chamber R1 is formed between the front plunger 35 and the sheave portion 322. The hydraulic chamber R1 is configured to receive a hydraulic pressure.

The annular base portion 321 includes a small diameter portion 324 formed at an end portion on a side opposite to the sheave portion 322.

A ring-shaped rear plunger 36 is press-fit on the small diameter portion 324. An inner circumference portion 36b of the rear plunger 36 is fixed in a state where the inner circumference portion 36b is press-fit to a stepped portion of the small diameter portion 324 on the sheave portion 322 side (a right side in the drawing).

In this state, the rear plunger 36 is provided in a state where the relative rotation between the rear plunger 36 and the annular base portion 321 is restricted so as not to be moved in the rotation axis X1 direction.

An outer circumference portion 36a of the rear plunger 36 is abutted on an inner circumference of a cylindrical cylinder wall portion 372 of the rear cylinder 37.

A D ring 9 is mounted on the outer circumference portion 36a of the rear plunger 36. The D ring 9 seals a clearance between the inner circumference of the circumference wall portion 372 and the outer circumference portion 36a.

The rear cylinder 37 includes a circular plate portion 371 inserted and mounted onto the shaft portion 311; and a circumference wall portion 372 surrounding an entire outer circumference of the circular plate portion 371.

The shaft portion 311 is press-fit in the inner circumference portion 371b of the circular plate portion 371. The inner circumference portion 371b of the circular plate portion 371 is sandwiched between a stepped portion 314 of the shaft portion 311, and the bearing 34A inserted and mounted onto the shaft portion 311.

The bearing 34A is positioned in the rotation axis X direction by a nut N screwed on the outer circumference of the shaft portion 311. The movement of the rear cylinder 37 adjacent to the bearing 34A in the direction apart from the slide pulley 32 is restricted by the bearing 34A.

The circumference wall portion 372 has an outside diameter smaller than an inside diameter of the cylindrical cylinder portion 323. A tip end portion 372a of the circumference wall portion 372 is abutted on the front plunger 35 in the rotation axis X direction within the cylinder portion 323.

The tip end portion 372a of the circumference wall portion 372 restricts the movement of the front plunger 35 in a direction apart from the sheave portion 322 (the leftward direction in the drawing).

The outer circumference portion 35a and the inner circumference portion 35b of the front plunger 35 are offset from each other in the rotation axis direction. The outer circumference portion 35a is positioned on the sheave portion 322 side of the slide pulley 32 relative to the inner circumference portion 35b.

The tip end portion 372a of the circumference wall portion 372 is abutted on the region of the outer circumference portion 35a of the front plunger 35 from the rotation axis X1 direction.

In the primary pulley 3, a space surrounded by the rear plunger 36, the front plunger 35, the circumference wall portion 372 of the rear cylinder 37 is a second hydraulic chamber R2. The hydraulic chamber R2 is configured to receive the hydraulic pressure.

The hydraulic chamber R1 and the hydraulic chamber R2 are adjacent to each other to sandwich the front plunger 35 on the bottom side (the left side in the drawing) when viewed from the sheave surface 322a. These hydraulic chamber R1 and hydraulic chamber R2 constitutes a pully pressure receiving chamber of the primary pulley 3.

Accordingly, it is possible to decrease the pressure receiving area of each of the pulley pressure receiving chambers (the hydraulic chamber R1 and R2). Therefore, it is possible to decrease the outside diameter of the primary pulley 3 (the sheave portion 322 and 312).

The shaft portion 311 of the fix pulley 31 includes an in-shaft oil passage 313 configured to supply the hydraulic pressure to the hydraulic chamber R1 and the hydraulic chamber R2.

The in-shaft oil passage 313 of the shaft portion 311 is opened in the one end 311a on the side cover 13 side (the left side in the drawing). A support cylinder 152 of the side cover 13 is loosely mounted in the in-cylinder oil passage 313 on the side cover 13 side (the left side in the drawing). A cylindrical bush 153 is inserted and mounted onto the support cylinder 152. A portion of the shaft portion 311 on the side cover 13 side is rotatably supported by the bush 153 mounted in the in-shaft oil passage 313.

In this state, a seal ring S provided on the outer circumference of the bush 153 seals a clearance between the outer circumference of the bush 153 and the inner circumference of the in-shaft oil passage 313.

The side cover 13 includes a support hole 15 which is formed at a portion confronting the transmission case 10, and which is for the bearing 34A. The side cover 13 includes a recessed portion 151 formed at a central portion of the support hole 15 when viewed in the rotation axis X1 direction, and which is for avoiding the interference with the shaft portion 311 of the fix pulley 31. The support cylinder 152 is provided at a central portion of the recessed portion 151.

The support cylinder 152 is configured to receive the hydraulic pressure (oil OL) from a hydraulic pressure control circuit (not shown) through a hydraulic passage 131 within the side cover. The hydraulic pressure supplied to the support cylinder 152 is supplied through the in-shaft oil passage 313 to the hydraulic chambers R1 and R2 (pulley pressure receiving chamber) of the slide pulley 32.

In the primary pulley 3, the slide pulley 32 is configured to be displaced in the rotation axis X1 direction by adjusting the supply pressure to the hydraulic chambers R1 and R2 (the pulley pressure chamber) of the slide pulley 32. With this, the groove width of the V groove 33 between the sheave surfaces 312a and 322a is varied in accordance with the supply pressure of the oil OL, so that the wounding radii of the belt V in the primary pulley 3 is varied.

As shown in FIG. 1, the secondary pulley 4 includes a fix pulley 41 (fix pulley) and a slide pulley 42 (movable pulley).

The fix pulley 41 includes a shaft portion (pulley shaft) 411 disposed along a rotation axis X2; and a sheave portion 412 extending from an outer circumference of the shaft portion 411 in the radially outward direction.

The slide pulley 42 includes an annular base portion 421 inserted and mounted onto the shaft portion 411 of the fix pulley 41; and a sheave portion 422 extending from the outer circumference of the annular base portion 421 in the radially outward direction.

The sheave portion 412 of the fix pulley 41 confronts the sheave portion 422 of the slide pulley 42 with a clearance in the rotation axis X2 direction.

The secondary pulley 4 includes a V groove 43 which is formed between the sheave surface 412a of the fix pulley 41 and the sheave surface 422a of the slide pulley 42, and around which the belt V is wound.

Bearings 44A and 44B are inserted and fixed onto a first end 411a and a second end 411b of the shaft portion 411 of the fix pulley 41 in the rotation axis X2 direction.

The second end portion 411b of the shaft portion 411 in the rotation axis X2 direction is rotatably supported through the bearing 44B on the support portion 102 of the transmission case 10 side.

The first end portion 411a of the shaft portion 411 in the rotation axis X2 direction is rotatably supported through the bearing 44A on the support hole 16 of the side cover 13 side.

The side cover 13 includes the support hole 16 which is formed at a portion confronting the transmission case 10, and which is for the bearing 44A. The side cover 13 includes a recessed portion 161 formed at a central portion of the support hole 16 when viewed in the rotation axis X2 direction, and which is for avoiding the interference with the shaft portion 411 of the fix pulley 41.

The support cylinder 162 is provided at a central portion of the recessed portion 161. The support cylinder 162 protrudes toward the transmission case 10 side (the right side in the drawing). A tip end side of the support cylinder 162 is loosely mounted in an in-shaft oil passage 413 of the fix pulley 41.

A cylindrical bush 163 is inserted and mounted onto the support cylinder 162. A portion of the shaft portion 411 on the side cover 13 side is rotatably supported by the bush 163 mounted in the in-shaft oil passage 413.

In this state, a seal ring S provided on the outer circumference of the bush 163 seals a clearance between the outer circumference of the bush 163 and the inner circumference of the in-shaft oil passage 413.

The in-shaft oil passage 413 is opened on the first end portion 411a of the shaft portion 411. The in-shaft oil passage 413 linearly extends along the rotation axis X2 of the fix pulley 41 within the shaft portion 411. The in-shaft oil passage 413 extends within the inner circumference side of the slide pulley 42 mounted onto the shaft portion 411 in the rotation axis X2 direction.

An oil hole 414 is formed at a tip end side (the right side in the drawing) of the in-shaft hydraulic passage 413. The oil hole 414 is configured to connect the in-shaft hydraulic passage 413 and the outer circumference of the shaft portion 411.

The support cylinder 162 is configured to receive the hydraulic pressure from the hydraulic pressure control circuit (not shown) through a hydraulic passage 132 within the side cover. The hydraulic pressure supplied to the support cylinder 162 is supplied through the in-shaft oil passage 413 to the hydraulic chambers R3 positioned radially outside the shaft portion 411.

In the secondary pulley 4, the slide pulley 42 is configured to be displaced in the rotation axis X2 direction by adjusting the supply pressure to the hydraulic chamber R3 (the pulley pressure chamber) of the slide pulley 42. With this, the groove width of the V groove 43 between the sheave surfaces 412a and 422a is varied in accordance with the supply pressure of the oil OL, so that the wounding radii of the belt V in the secondary pulley 4 is varied.

The sheave portion 422 of the slide pulley 42 includes a cylinder portion 423 formed on a pressure receiving surface 422b on a side opposite to the sheave surface 422a.

The cylinder portion 423 extends along the rotation axis X2 in a direction apart from the sheave portion 422 to have a predetermined length L2.

An outer circumference portion 45a of a plunger 45 is abutted on the inner circumference of the cylinder portion 423.

A D ring 9 is mounted on the outer circumference portion 45a of the plunger 45. The D ring 9 seals a clearance between the inner circumference of the cylinder portion 423 and the outer circumference portion 45a.

The plunger 45 includes a cylindrical mounting portion 451 formed on the inner circumference side. The mounting portion 451 is spline-mounted on the outer circumference of the shaft portion 411 of the fix pulley 41. The mounting portion 451 of the plunger 45 is positioned between the bearing 44B and the stepped portion 411c of the shaft portion 411 in the rotation axis X2 direction.

A region of the plunger 45 adjacent to the mounting portion 451 extends in a direction toward the sheave portion 422 (the leftward direction in the drawing) on the outer circumference side of the annular base portion 421 of the slide pulley 42, and bends toward the outer circumference side.

In the plunger 45, a first end of the spring Sp is abutted on a region bent on the outer circumference side from the rotation axis X2 direction. A second end of the spring Sp is abutted on the pressure receiving surface 422b of the sheave portion 422. The spring Sp is provided in a state where the spring Sp is compressed in the rotation axis X direction. The slide pulley 42 is pressed by the urging force acted by the spring Sp in a direction where the groove width of the V groove 43 is decreased (in a direction where the variator 2 is brought to the highest transmission gear ratio side).

As shown in FIG. 2, the region of the side cover 13 on the primary pulley 3 side includes boss portions 17 each of which is positioned at a position adjacent to the support hole 15 of the bearing 34A, and each of which has a bolt hole 17a.

The plurality of boss portions 17 are provided at a regular interval in the circumferential direction around the rotation axis X1.

Each of the bolt holes 17a is formed along an axis Xa. Each of the bolt holes 17a penetrates in a thickness direction of the side cover 13. In this case, the axis Xa is parallel to the rotation axis X1 of the primary pulley 3.

A ring-shaped retainer 18 is provided within the side cover 13 to surround the support hole 15 of the bearing 34A. The retainer 18 has an inside diameter smaller than an opening diameter of the support hole 15 so as to prevent the bearing 34A from falling (dropping out) from the support hole 15.

The bolt B is screwed into the bolt hole 17a after the retainer 18 is positioned on the surface of the side cover 13 on the transmission case 10 side. With this, the shaft portion B1 of the bolt B penetrates through the retainer 18 within the side cover 13 in the axis Xa direction. With this, the retainer 18 is disposed to support an outer race of the bearing 34A.

As shown in FIG. 3A, in the side cover 13, the circumference wall portion 372 of the rear cylinder 37 is positioned on an extension of the axis Xa passing through the center of the bolt hole 17a of the boss portion 17.

That is, the bolt B is positioned to be overlapped with the circumference wall portion 372 positioned at the outermost circumference portion of the rear cylinder when viewed from the axis Xa (the rotation axis X1) direction.

The tip end Bx of the bolt B confronts a boundary portion 373 between the circular plate portion 371 and the circumference wall portion 372 of the rear cylinder 37 in the axis Xa direction. The tip end Bx of the bolt B is disposed with a clearance CL1 with respect to the boundary portion 373.

A width of this clearance CL1 is set based on the result of the experiment and the simulation so that the boundary portion 373 of the rear cylinder 37 is abutted on the tip end Bx of the bolt B when the rear cylinder 37 is deformed when the hydraulic pressure which is equal to or greater than a predetermined value is supplied to the pulley pressure receiving chambers (the hydraulic chamber R1 and the hydraulic chamber R2).

For example, the case where the hydraulic pressure which is equal to or greater than the predetermined value is supplied to the pulley pressure receiving chambers (the hydraulic chamber R1 and the hydraulic chamber R2) is a case where the malfunction of the valve within the control valve (not shown) is generated.

This abutment timing is set to a timing before the deformation of the rear cylinder 37 becomes the region of the plastic deformation after the elastic deformation (before the yield). This is because when the deformation of the rear cylinder 37 reaches the region of the plastic deformation, the shape of the rear cylinder 37 may not be returned to the original shape even when the hydraulic pressure within the pulley receiving chambers (the hydraulic chamber R1 and the hydraulic chamber R2) is returned to the normal pressure.

Accordingly, in this embodiment, the clearance CL1 is set to suppress the plastic deformation of the rear cylinder 37 while allowing the elastic deformation of the rear cylinder 37.

That is, the deformation of the rear cylinder 37 is started, the rear cylinder 37 is abutted on the bolt B which is a stopper member so as to prevent the plastic deformation of the rear cylinder 37. At least, the plastic deformation of the rear cylinder 37 is suppressed to the minimum amount.

It is possible to suppress the plastic deformation of the rear cylinder 37. Accordingly, it is possible to decrease the thickness of the rear cylinder 37 (the circular plate portion 371 and the circumference wall portion 372), and thereby to decrease the weight of the primary pulley 3.

The R processing is performed on the outer circumference of the boundary portion 373 between the circular plate portion 371 and the circumference wall portion 372 of the rear cylinder 37. With this, the portion around the boundary portion 373 is hard to be damaged when the rear cylinder 37 is abutted on the tip end Bx of the bolt B.

The grooves 38 are formed in the circumference wall portion 372 confronting the tip end Bx of the bolt B. The grooves 38 linearly extend along the rotation axis X1.

As shown in FIGS. 4A and 4B, each of the grooves 38 has a length Lx in the rotation axis X1 direction. The length Lx is a length from the region in which the groove 38 is overlapped with the circular plate portion 371, to a portion near the tip end portion 372a of the circumference wall portion 372 when viewed from the radial direction of the rotation axis X1.

Each of the grooves 38 has a width Wx in the entire length in the rotation axis X1 direction.

The grooves 38 are formed in the outer circumference of the circumference wall portion 372 at a predetermined interval (predetermined width Wx) in the circumferential direction around the rotation axis X1. The grooves 38 are formed in the entire circumference in the circumferential direction around the rotation axis X1.

The region in which each of the grooves 38 is formed, and the region in which each of the grooves 38 is not formed are formed in the outer circumference of the circumference wall portion 372 to have the same width Wx. The regions in which the grooves 38 are formed, and the regions in which the grooves 38 are not formed are alternatingly positioned.

The tip end portion 372a of the circumference wall portion 372 is an abutment portion abutted on the front plunger 35 in the rotation axis X direction. The pressing force according to the hydraulic pressure supplied to the hydraulic chamber R1 is acted to the tip end portion 372a from the front plunger 35 side.

In this embodiment, each of the groove 38 is formed in the range of the length Lx extending to the portion near the tip end portion 372a of the circumference wall portion 372 in the rotation axis X1 direction.

The grooves 38 are provided for the use of sensed portions of a rotation speed sensor 120, and for decreasing the thickness of the rear cylinder 37 for decreasing the weight of the rear cylinder 37.

The rotation speed sensor 120 is provided at a position near the circular plate portion 371 radially outside the circumference wall portion 372. The rotation speed sensor 120 is provided so that a sensing surface 120a is directed to the circumference wall portion 372. In this state, the sensing surface 120a which is a sensing portion of the rotation speed sensor 120 is disposed to direct in the radial direction.

Each of the grooves 38 includes a first groove portion 381 which confronts the sensing surface 120a, and which functions as the sensed portion of the rotation speed sensor 120; and a second groove portion 382 which is a region other than the first groove portion 381.

In each of the grooves 38, the first groove portion 381 and the second groove portion 382 is connected in series with each other. The first groove portion 381 is positioned on the circular plate portion 371 side of the second groove portion 382.

A length La of the first groove portion 381 in the rotation axis X1 direction is shorter than a length Lb of the second groove portion 382 in the rotation axis X1 direction (La<Lb).

In this case, in the primary pulley 3, the slide pulley 32 is displaced in the rotation axis X1 direction in accordance with the variation of the transmission gear ratio of the variator 2 to vary the groove width of the V groove 33 (the width in the rotation axis X1 direction).

In this case, the groove width of the V groove 33 is maximum at the lowest transmission gear ratio (cf. FIG. 3A). The groove width of the V groove 33 is minimum at the highest transmission gear ratio (cf. FIG. 3B).

When the slide pulley 32 is displaced in the rotation axis X1 direction, the cylinder portion 323 of the slide pulley 32 is also displaced in the rotation axis X1 direction.

In this embodiment, the length La of the first groove portion 381 is set so as not to avoid the interference of the rotation speed sensor 120 with the cylinder portion 323 of the slide pulley 32 displaced in the rotation axis X direction.

Accordingly, the first groove portion 381 is not overlapped with the cylinder portion 323 (the pulley cylindrical portion) in the radial direction of the rotation axis X1. That is, in this embodiment, the first groove portion 381 is set so as not to be overlapped with the movement region of the cylinder portion 323 linked with the movement of the slide pulley 32 in the rotation axis X1 direction when viewed in the radial direction.

On the other hand, the second groove portion 382 is overlapped with the cylinder portion 323 in the radial direction when the groove width of the V groove 33 becomes equal to or greater than the predetermined width.

In this way, the first groove portion 381 which is the sensed portion of the rotation speed sensor 120 is set so as not be overlapped with the cylinder portion 323 in the radial direction in the region of the entire transmission gear ratio of the variator 2. With this, the interference between the rotation speed sensor 120 and the cylinder portion 323 is avoided.

On the other hand, the second groove portion 382 is the region which does not function as the sensed portion of the rotation speed sensor 120. The second groove portion 382 is overlapped with the cylinder portion 323 in the radial direction in the predetermined transmission gear ratio region of the variator 2. The second groove portion 382 extends to the region of the inner circumference side of the cylinder 323. The second groove portion 382 largely serves for the weight decrease by the thickness decrease of the circumference wall portion 372.

Besides, it is preferable for the weight decrease that the second groove portion 382 has the length by which the second groove portion 382 is overlapped with the cylinder portion 323 in the entire transmission gear ratio region. However, the second groove portion 382 may be designed so as to be overlapped with the cylinder portion 323 in a part of the transmission gear ratio region, and so as not to be overlapped with the cylinder portion 323 in another part of the transmission gear ratio region.

As described above, the continuously variable transmission 1 according to the embodiment includes the following configuration.

(1) A continuously variable transmission includes:
   the fix pulley 31;
   the slide pulley 32;
   the belt V (the endless annular member) sandwiched by the fix pulley 31 and the slide pulley 32;
   a rear cylinder 37 (cylinder member) which is fixed to the fix pulley 31, and which includes a circumference wall portion 372 (cylinder cylindrical portion) of the hydraulic chambers R1 and R2 (pulley pressure receiving chamber); and
   a bolt B (stopper member) disposed at a position at which the bolt B is abutted on the rear cylinder 37 when a hydraulic pressure which is equal to or greater than a predetermined value is supplied to the hydraulic chambers R1 and R2 (pulley pressure receiving chamber).

By this configuration, in a case where the rear cylinder 37 is deformed when the hydraulic pressure which is equal to or greater than the predetermined value is supplied to the hydraulic chambers R1 and R2 (pulley pressure receiving chamber), the bolt B (stopper member) is abutted on the rear cylinder 37 to suppress the deformation of the rear cylinder 37. With this, it is possible to suppress the deformation of the cylinder member without the increase of the number of the components, and the increase of the weight.

In this case, the position of the bolt B, and the thickness of the rear cylinder 37 are set to suppress the plastic deformation while allowing the elastic deformation of the rear cylinder 37. When the deformation of the rear cylinder 37 is started, the bolt B is configured to be abutted on the rear cylinder 37 before the plastic deformation is generated.

With this, it is possible to prevent the plastic deformation of the rear cylinder 37, or to suppress the plastic deformation of the rear cylinder 37 to the minimum amount.

With this, when the supply of the hydraulic pressure which is equal to or greater than the predetermined value is solved, the rear cylinder 37 is rapidly returned to the original shape. Accordingly, it is possible to prevent the generation of the problems in the hydraulic chambers R1 and R2 due to the deformation of the rear cylinder 37.

Therefore, it is possible to decrease the thickness of the constituting portion of rear cylinder 37, and to decrease the weight of the rear cylinder 37 by the decreased thickness.

Moreover, it is unnecessary to provide a new relief valve (valve) configured to prevent the supply of the hydraulic pressure which is equal to or greater than the predetermined value to the hydraulic chambers R1 and R2 (the pulley pressure receiving chamber). Accordingly, it is possible to prevent the increase of the number of the components.

The continuously variable transmission 1 according to the embodiment includes the following configuration.

The bolt B which is the stopper member is disposed at a position at which the bolt B is overlapped with an outermost outer circumference portion of the rear cylinder 37 when viewed from the rotation axis X1 direction.

It is not preferable that the rear cylinder 37 is further deformed after the abutment on the bolt B by the principle of the lever with the abutment point between the bolt B and the rear cylinder 37.

The bolt B is provided near the circumference wall portion 372 positioned at the outermost circumference portion of the rear cylinder 37. With this, when the rear cylinder 37 is deformed, it is possible to prevent the further deformation of the rear cylinder 37 by the principle of the lever with the abutment portion with the bolt B.

In particular, the rear cylinder 37 includes the cylindrical circumference wall portion 372 disposed along the extension line of the bolt B; and the circular plate portion 371 sealing the opening portion of the circumference wall portion 372 on the bolt B side. The rear cylinder 37 has the bottomed cylindrical shape. The tip end Bx of the bolt B confronts the boundary portion 373 between the circular plate portion 371 and the circumference wall portion 372. The tip end Bx of the bolt B is disposed with the clearance CL1 with respect to the boundary portion 373.

In this configuration, the boundary portion 373 between the circular plate portion 371 and the circumference wall portion 372 has the rigidity and the strength higher than those of the other portions. Accordingly, the bolt B is configured to be abutted on the boundary portion 373 at the deformation of the rear cylinder 37. With this, it is possible to prevent the deformation of the rear cylinder 37.

Besides, the abutment position of the rear cylinder 37 on the bolt B may be other portions other than the boundary portion 373 as long as it is possible to prevent the plastic deformation of the rear cylinder 37, or to suppress the plastic deformation to the minimum degree.

Moreover, in this embodiment, the stopper member is the bolt B. However, the stopper member may be other members as long as it is abutted on the rear cylinder 37 to prevent the plastic deformation of the rear cylinder 37. For example, a protruding portion may be provided on the inner circumference of the side cover 13. The rear cylinder is configured to be abutted on this protruding portion to suppress the plastic deformation.

The continuously variable transmission 1 according to the embodiment includes the following configuration.

(3) When the hydraulic pressure supplied to the hydraulic chambers R1 and R2 (pulley pressure receiving chamber) is smaller than the predetermined value, the rear cylinder 37 is not abutted on the bolt B which is the stopper member.

The bolt B is a fixed element fixed to the side cover 13 (case). The rear cylinder 37 is a rotation element configured to rotate with the primary pulley 3 (pulley).

Accordingly, in a case where the rear cylinder 37 and the bolt B which is the stopper member are constantly abutted on each other, the interference is generated to cause the noise. Therefore, in a normal state in which the hydraulic pressure supplied to the hydraulic chambers R1 and R2 (pulley pressure receiving chamber) is smaller than the predetermined value, the rear cylinder 37 and the bolt B are configured so as not to be abutted on each other. With this, it is possible to prevent the generation of the noise.

The continuously variable transmission 1 according to the embodiment includes the following configuration.

(4) When the hydraulic pressure which is equal to or greater than the predetermined value is supplied to the hydraulic chamber (pulley pressure receiving chamber), the rear cylinder 37 is configured to be abutted on the bolt B which is the stopper member before the rear cylinder 37 is plastic-deformed.

In the present invention, the plastic deformation of the rear cylinder 37 is prevented. Alternatively, the plastic deformation of the rear cylinder 37 is suppressed to the minimum amount. However, it is preferable to prevent the plastic deformation of the rear cylinder 37.

That is, the distance between the cylinder member and the stopper member is set so that the cylinder member is abutted on the stopper member before the cylinder member is plastic-deformed when the hydraulic pressure which is equal to or greater than the predetermined value is supplied to the pulley pressure receiving chamber.

Besides, the grooves 38 extending in the rotation axis X1 direction are formed on the outer circumference portion 372 of the rear cylinder 37. The plurality of the grooves 38 are provided at the predetermined interval in the circumferential direction around the rotation axis X1.

Accordingly, the regions between the adjacent grooves 38 and 38 function as reinforcement ribs by providing the plurality of the grooves 38. Accordingly, when the rear cylinder 37 is abutted on the bolt B, it is possible to suppress the large deformation at the circumference wall portion.

Hereinabove, the embodiment of the present invention is explained. The present invention is not limited to the aspects shown in the embodiment. The present invention can be varied as long as the variation is within the technical thought of the present invention.

The invention claimed is:

1. A continuously variable transmission comprising:
   a fix pulley;
   a slide pulley:
   an endless annular member sandwiched by the fix pulley and the slide pulley;
   a cylinder member which is fixed to the fix pulley, and which includes a cylinder cylindrical portion constituting a wall of a pulley pressure receiving chamber;
   a restriction member configured to restrict an axial movement of the cylinder member; and
   a stopper member disposed at a position at which the stopper member is abutted on the cylinder member when a hydraulic pressure which is equal to or greater than a predetermined value is supplied to the pulley pressure receiving chamber, provided radially outside the restriction member.

2. A continuously variable transmission comprising:
a fix pulley;
a slide pulley:
an endless annular member sandwiched by the fix pulley and the slide pulley;
a cylinder member which is fixed to the fix pulley, and which includes a cylinder cylindrical portion constituting a wall of a pulley pressure receiving chamber; and
a stopper member disposed at a position at which the stopper member is abutted on the cylinder member when a hydraulic pressure which is equal to or greater than a predetermined value is supplied to the pulley pressure receiving chamber,
wherein the stopper member is disposed at a position at which the stopper member is overlapped with an outermost outer circumference portion of the cylinder member when viewed from an axial direction.

3. The continuously variable transmission as claimed in claim 2, wherein when the hydraulic pressure supplied to the pulley pressure receiving chamber is smaller than the predetermined value, the cylinder member is not abutted on the stopper member.

4. The continuously variable transmission as claimed in claim 1, wherein when the hydraulic pressure which is equal to or greater than the predetermined value is supplied to the pulley pressure receiving chamber, the cylinder member is configured to be abutted on the stopper member before the cylinder member is plastic-deformed.

\* \* \* \* \*